United States Patent [19]
Brossi et al.

[11] 3,888,907
[45] June 10, 1975

[54] LOWER ALKYL ESTERS OF 2-(3,4-DIMETHOXYPHENYL)-4,6-DIOXOCYCLOHEXANE CARBOXYLIC ACID

[75] Inventors: Arnold Brossi, Verona; Benjamin Pecherer, Montclair, both of N.J.

[73] Assignee: Hoffmann-La Roche Inc., Nutley, N.J.

[22] Filed: Mar. 23, 1973

[21] Appl. No.: 344,382

Related U.S. Application Data

[60] Division of Ser. No. 884,327, Dec. 11, 1969, Pat. No. 3,751,487, which is a continuation-in-part of Ser. No. 559,383, June 22, 1966, abandoned.

[52] U.S. Cl............................. 260/473 R; 280/473
[51] Int. Cl............................................ C07c 69/76
[58] Field of Search..................... 260/473 R, 520

[56] References Cited
UNITED STATES PATENTS

| | | | |
|---|---|---|---|
| 3,457,295 | 7/1969 | Brossi et al. | 280/473 R |
| 3,654,343 | 4/1972 | Brossi et al. | 260/473 R |
| 3,729,519 | 4/1973 | Brossi et al. | 260/473 S |

OTHER PUBLICATIONS
Newman et al., J. Org. Chem., 31(5), 1451–5, (1966).

Primary Examiner—John F. Terapane
Attorney, Agent, or Firm—Samuel L. Welt; Bernard S. Leon; William G. Isgro

[57] ABSTRACT

Substituted dibenzo[c,e]azepines and dibenzo[d,f]azonines, prepared through various sequential intermediates, for example, starting with a compound of the formula

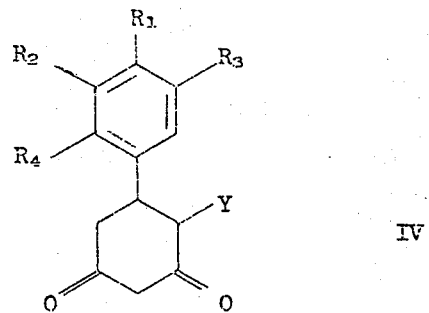

IV wherein $R_1$, $R_2$, $R_3$, $R_4$ and Y are as defined hereinafter, are described. The end products are useful as hypotensive agents.

2 Claims, No Drawings

LOWER ALKYL ESTERS OF 2-(3,4-DIMETHOXYPHENYL)-4,6-DIOXOCYCLOHEXANE CARBOXYLIC ACID

CROSS-REFERENCE TO RELATED APPLICATIONS

This is a division, of application Ser. No. 884,327 filed Dec. 11, 1969, now U.S. Pat. No. 3,751,487, patented Aug. 7, 1973 which in turn is a continuation-in-part application of Ser. No. 559,383, filed June 22, 1966, now abandoned.

BRIEF SUMMARY OF THE INVENTION

The invention comprises the preparation of compounds of the formula

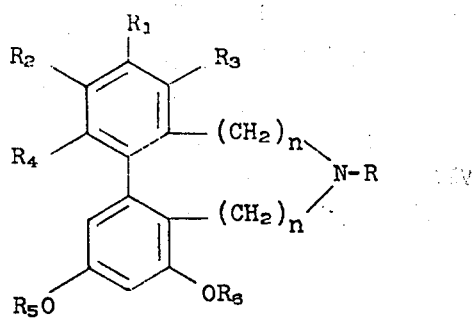

I wherein R is lower alkyl, lower alkenyl, lower alkynyl, cyclo-lower alkyl, cycloalkyl-lower alkyl, aryl, aralkyl, hydroxyalkyl, alkoxyalkyl or dialkylaminoalkyl; $R_1$ and $R_2$ are each independently lower alkyl, lower alkoxy or benzyloxy; $R_3$ and $R_4$ are each independently hydrogen, lower alkyl or lower alkoxy; $R_5$ and $R_6$ are each independently methyl or ethyl; and $n$ is an integer from 1 to 2 and salts thereof.

In another aspect, the invention relates to novel intermediates, for example, compounds of the formulas

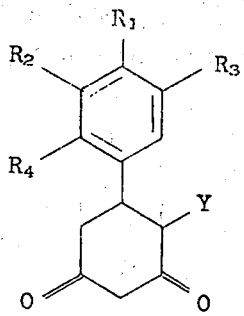

IV ,

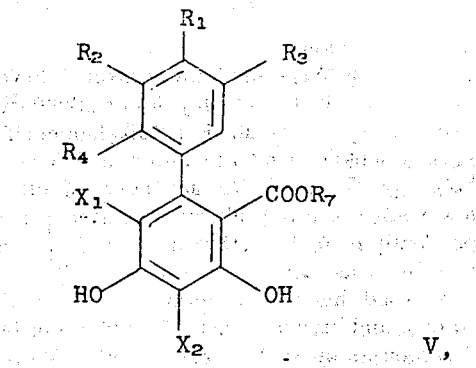

V ,

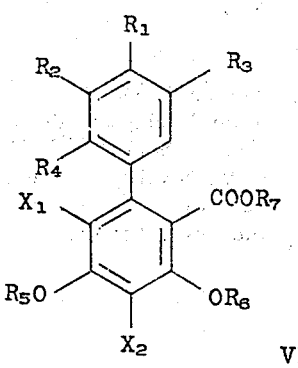

VI,

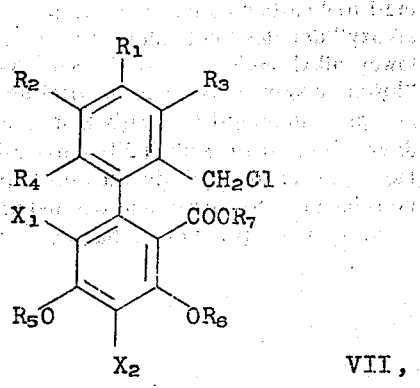

VII , and

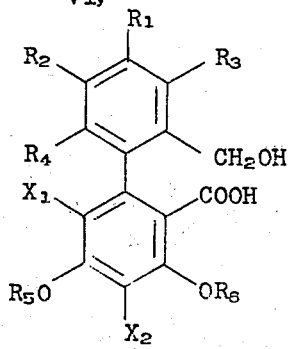

VIII wherein $R_1$, $R_2$, $R_3$, $R_4$, $R_5$, $R_6$, $R_7$, $X_1$, $X_2$ and Y are as described herein.

DETAILED DESCRIPTION OF THE INVENTION

The present invention relates to the preparation of substituted dibenzo-polymethyleneimines, to novel substituted dibenzo-polymethyleneimines and novel intermediates useful in the preparation thereof. More particularly, this invention relates to novel substituted dibenzo[c,e]azepines and to novel substituted dibenzo[d,f]azonines and to novel intermediates and processes for the preparation thereof.

In its broad process aspect the invention comprises a novel chemical synthesis for the preparation of compounds of the formula

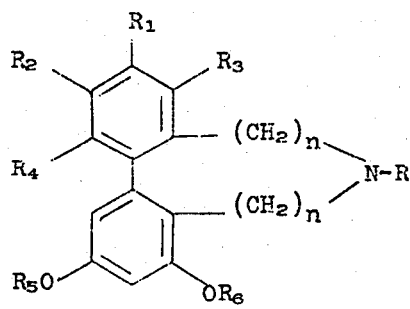

I wherein R is lower alkyl, lower alkenyl, lower alkynyl, cyclo-lower alkyl, cycloalkyl-lower alkyl, aryl, aralkyl, hydroxyalkyl, alkoxyalkyl or dialkylaminoalkyl; $R_1$ and $R_2$ are each independently lower alkyl, lower alkoxy or benzyloxy; $R_3$ and $R_4$ are each independently hydrogen, lower alkyl or lower alkoxy; $R_5$ and $R_6$ are each independently methyl or ethyl; and $n$ is an integer from 1 to 2 and salts thereof.

As used herein the term "lower alkyl" denotes straight and branched chain hydrocarbons having 1 to 7 carbon atoms such as methyl, ethyl, propyl, isopropyl, butyl, t-butyl and the like. Lower alkyl groups having 1 to 4 carbon atoms are preferred. The term "lower alkoxy" denotes lower alkyl ether groups wherein the lower alkyl moiety is as defined above. The term "lower alkenyl" denotes unsaturated hydrocarbon groups containing 1 to 7 carbon atoms and at least one double bond such as allyl, 2-butenyl, 3-butenyl and the like. "Lower alkynyl" denotes unsaturated hydrocarbons having 1 to 7 carbon atoms and at least one triple bond such as 2-propynyl, 2-butynyl, 3-butynyl and the like. The term "cycloalkyl" denotes saturated carbocyclic groups containing 3 to 6 ring atoms. The term "aryl" denotes phenyl and substituted phenyl groups, preferably methoxyphenyl or poly-methoxyphenyl. The term "aralkyl" denotes arylalkyl groups such as benzyl, phenethyl, methoxyphenethyl, poly-methoxyphenethyl and the like. The terms "halo," "halogen," "halide" and the like denote the halogens chlorine, bromine and iodine.

In one of its specific product aspects this invention relates to novel substituted dibenzo[c,e]azepines within the class of compounds of formula I which can be represented by the formula

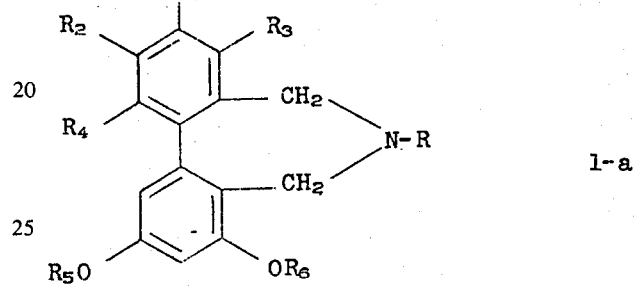

I-a wherein R and $R_1$ through $R_6$ have the same meaning as above and salts thereof.

In another of its specific aspects this invention relates to the novel process leading to compounds of formula I-a above. This aspect of the invention can be traced with respect to the following schematic diagram (1).

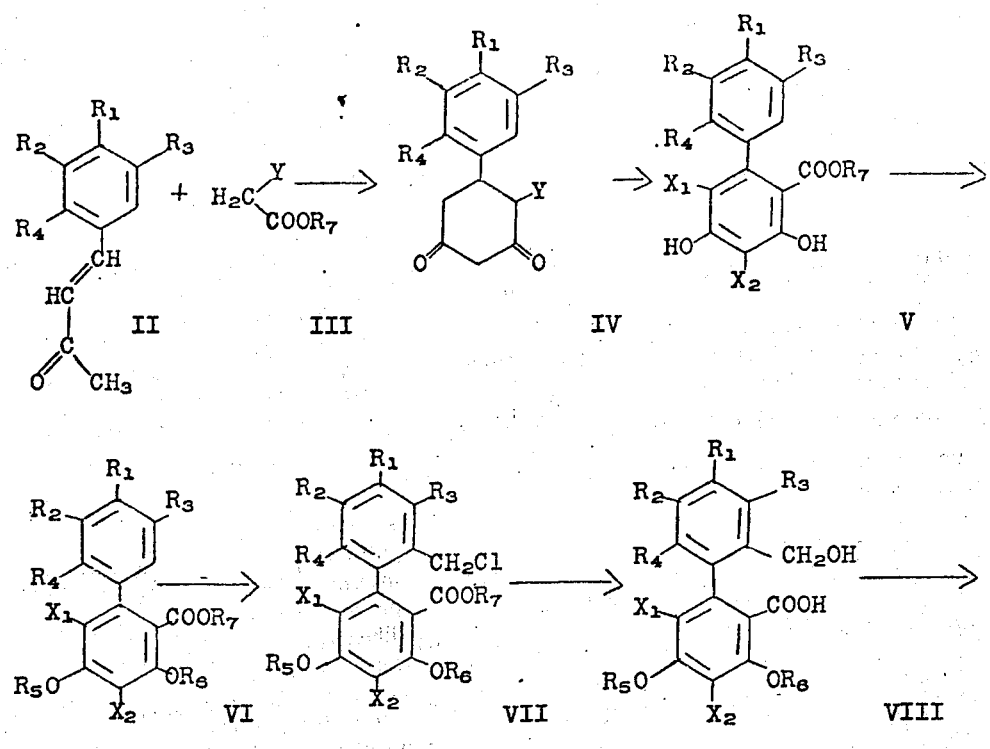

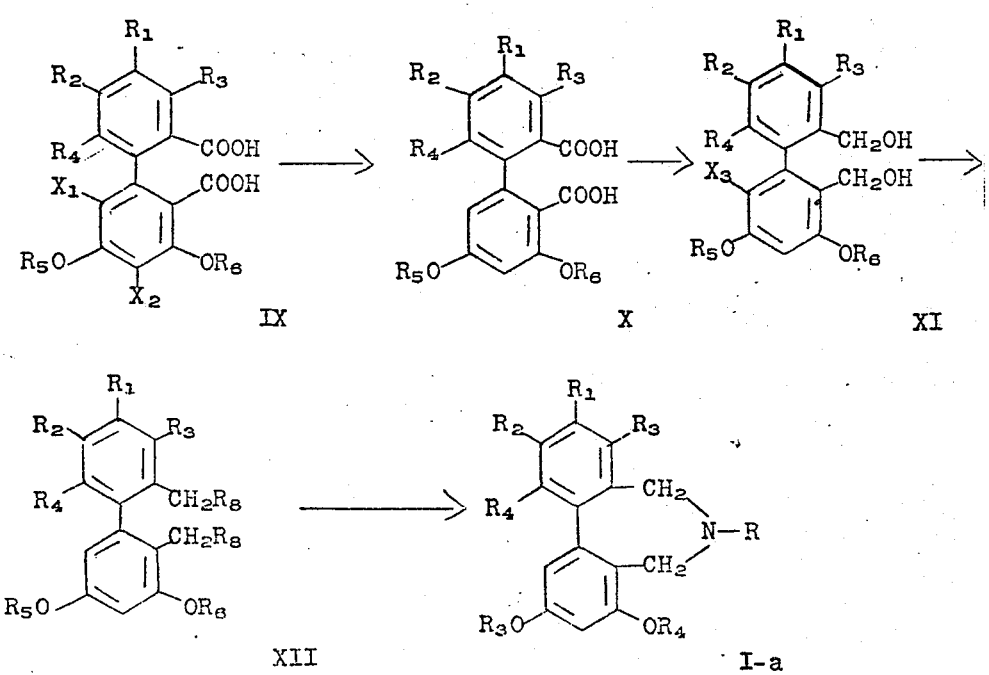

In schematic diagram (1) the symbols R and $R_1$-$R_6$ have the same significance as hereinabove. The symbols $X_1$ and $X_2$ independently represent one of the halogens, bromine, chlorine and iodine; and $X_3$ represents hydrogen or one of the halogens, bromine, chlorine and iodine. The symbol Y represents cyano or the ester group $COOR_7$ wherein $R_7$ is lower alkyl and $R_8$ represents a leaving group such as halogen, i.e., chlorine, bromine or iodine, and obvious equivalent leaving groups.

The ketonic starting materials of formula II are known compounds readily available by procedures known to the art. Likewise, the lower alkylcyano acetic ester or di-lower alkyl malonate starting materials of formula III are also known compounds available in the art. The intermediates of formulas IV through XII are novel compounds with the exclusion of the compound of formula X wherein $R_1$ and $R_2$ are each methoxy; $R_3$ and $R_4$ are each hydrogen; and $R_5$ and $R_6$ are each methyl, i.e., the compound 3,4',5,5'-tetramethoxy diphenic acid, and these novel intermediates constitute part of this invention.

The reaction sequence as outlined in the above schematic diagram leading to the novel dibenzo[c,e]azepines of formula I-a comprises the following steps:

a. Condensation of the readily available acetone derivative of formula II with a malonic or cyano acetic ester of formula III whereby there is obtained a diketo ester of formula IV. The reaction is preferably carried out in an anhydrous medium in the presence of a metal alkoxide such as sodium methoxide, sodium ethoxide, potassium methoxide, lithium alkoxide and the like. The reaction temperature is not critical though it is preferred to operate at a temperature between about room temperature and about 110°C. when a cyanoacetic ester of formula III is employed as a starting material, there is obtained the corresponding diketo carbonitrile of formula IV wherein Y is cyano which, on alcoholysis, yields the corresponding diketo ester of formula IV. Alternatively, the compound of formula IV can be obtained by an analogous condensation employing lower alkyl cinnamates and a lower alkyl acetoacetate as starting material.

b. Halogenation of the diketo ester of formula IV with halogen, preferably bromine, or sulfuryl chloride in the presence of a suitable solvent to give the substituted biphenyl carboxylic acid ester of formula V. As solvent there can be employed, for example, acetic acid or pyridine-dimethylformamide, the latter being the preferred solvent. The reaction is preferably carried out below room temperature though higher temperatures could also be emloyed; preferably the reaction is carried out between about −40°C. and about 25°C.

c. Alkylation with any of the usual methylating or ethylating agents such as dimethylsulfate or diethylsulfate in the presence of an alkali such as sodium or potassium carbonate, to give the corresponding compounds of formula VI. Any suitable inert medium such as a hydrocarbon or benzene, toluene and the like can be employed. The reaction is conveniently carried out between about room temperature and the reflux temperature of the reaction mixture, preferably between about room temperature and about 125°C.

d. Chloromethylation to give the compound of formula VII. The chloromethylation is preferably carried out by treating with either gaseous or aqueous hydrogen chloride in the presence of a paraformaldehyde-formic acid mixture. Either aqueous or solid formaldehyde could be employed. The chloromethylation is conveniently carried out at temperatures between about room temperature and about 100°C.

e. Alkaline hydrolysis to form the corresponding hydroxymethyl acids of formula VIII. Alkali metal hydroxides such as sodium hydroxide, potassium hydroxide and the like are suitably employed as the alkaline reagents for hydrolysis. It is preferred to operate in a miscible cosolvent such as dioxane, dimethoxyethane, higher alkoxypolyethylene glycols and the like and preferably at an elevated temperature, e.g., a temperature between about room temperature and the reflux temperature of the hydrolysis mixture, suitably a temperature up to about 125°C.

f. Oxidation to give the substituted diphenic acids of formula IX. Oxidizing agents suitably employed in this step of the process are, for example, permanganates, e.g., potassium permanganate, etc., chromates and dichromates, e.g., potassium dichromate, and the like. The reaction is carried out in an appropriate acidic or alkaline solution and conveniently at room temperature or above.

g. Catalytic dehalogenation to give the compound of formula X wherein $X_1$ and $X_2$ are hydrogen. As catalyst there can be suitably employed nickel or a noble metal catalyst. The reaction is preferably carried out under pressure, e.g., pressures between slightly above atmospheric and 250 p.s.i., and at temperatures preferably between about room temperature and about 80°C. in the presence of an acid binding agent such as alkali hydroxides or acetates. As solvent water or lower alkanols, etc., can be conveniently employed.

h. Reduction of the diphenic acids or esters thereof represented by formula X with lithium aluminum hydride to form the diols of formula XI wherein $X_3$ is hydrogen. The esters of formula X are readily prepared from the acids by the usual esterification techniques with lower alkanols. The reduction is suitably carried out in an inert solvent such as the lower ethers, tetrahydrofuran and the like and conveniently at a temperature between about 0°C. and 100°C. Alternatively, compounds of formula XI wherein $X_3$ is halogen are obtained directly from compounds of formula IX by hydrogenolysis, i.e., treatment with a limited quantity of lithium aluminum hydride.

i. Reaction with phosphorus trihalide, e.g., phosphorus tribromide, phosphorus trichloride, etc.; hydrohalic acids, e.g., hydrobromic acid, etc. or other equivalent reagents to form the compound of formula XII. The reaction is preferably carried out in an inert solvent such as aromatic hydrocarbons, lower ethers and the like at temperatures between about room temperature and about 50°C.

j. Condensation of the compounds of formula XII with a primary amine to form the novel dibenzo[c-,e]azepines of formula I-a wherein $n$ is 1. Primary amines which can be suitably employed in the condensation are, for example, the lower alkyl amines, e.g., methylamine, ethylamine and propylamine, n-butylamine, isobutylamine, t-butylamine, pentylamine, etc.; alkenyl amines, e.g., allylamine, butenylamine, etc.; alkynyl amines, e.g., propargylamine, etc.; cycloalkyl amines, e.g., cyclopropylamine, cyclohexylamine, etc.; cycloalkyl-lower alkyl amines, e.g., cyclopropylmethylamine, cyclohexylmethylamine, etc.; aryl amines, e.g., aniline, para-methoxyaniline, etc.; aralkyl amines, e.g., benzylamine, para-methoxybenzylamine, phenethylamine, etc.; hydroxyalkyl or alkoxyalkyl amines, e.g., 2-aminoethanol or 2-ethoxyethylamine, 3-aminopropanol, etc.; dialkylamino amines, e.g., dimethylaminoethylamine, diethylaminomethylamine, diethylaminoethylamine, etc., and the like.

The condensation reaction with a primary amine can be conveniently carried out by employing the amine reactant as solvent or in any other suitably inert solvent in the presence of an acid binding agent which may be the amine itself or other acid binding agents such as hydroxides, carbonates, etc. The reaction temperature is not critical. However, it is convenient to operate between about 0°C. and about 100°C.

In still another specific aspect this invention is directed to the novel substituted dibenzo[d,f]azonines of the formula

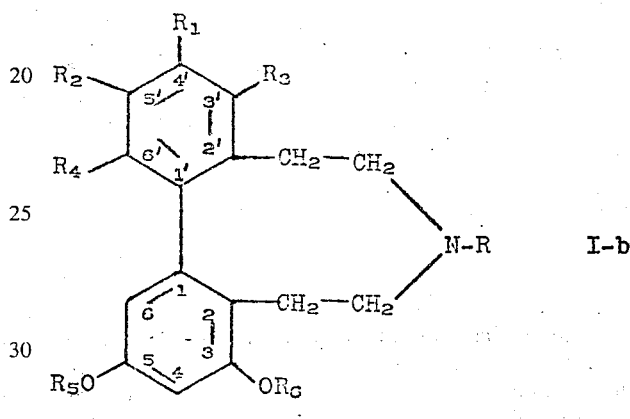

I-b wherein R and $R_1$-$R_6$ have the same meaning as hereinabove such that when $R_1$ and $R_2$ are both methoxy, $R_3$ and $R_4$ are both hydrogen and $R_5$ and $R_6$ are both methyl, then R must be other than methyl and salts thereof.

Whereas the known tetramethoxy-dibenzo[d,f]azonine, protostephanine, has been available from *Stephania japonica* for more than a quarter of a century, no synthetic process for its preparation has been disclosed heretofore. Nor have any of the prior art investigators been successful in the preparation of unsymmetrically substituted dibenzo[d,f]azonines of the type represented by formula I-b.

Accordingly, this invention, in yet another of its specific aspects, relates to a new synthetic route for the preparation of the novel dibenzo[d,f]azonines of formula I-b as well as for the synthesis of the known pharmacologically active dibenzo[d,f]azonine, protostephanine. The novel processes of this invention leading to the unsymmetrically substituted dibenzo[d,f]azonines of formula I-b from the novel intermediates obtained in the synthesis of the dibenzo[c,e]azepines of formula I-a can be traced with respect to the following schematic diagram (2).

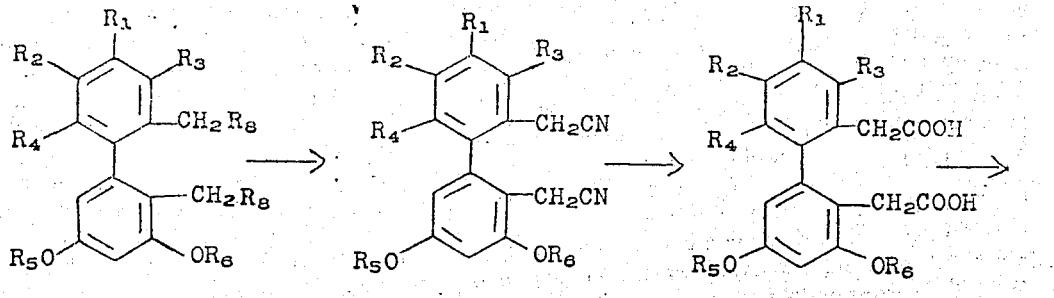

XII     XIII     XIV

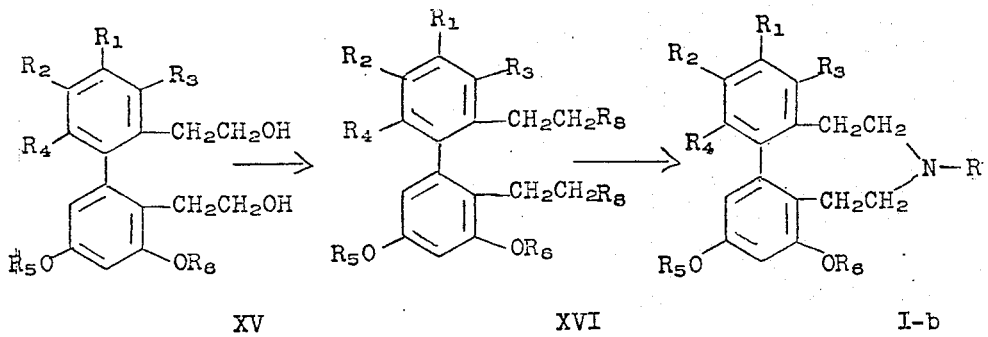

The symbols R and $R_1$ through $R_6$ in the above formulas have the same meaning as like symbols hereinabove.

The reaction sequence for the preparation of unsymmetrically substituted dibenzo[d,f]azonines starting from the intermediates for formula XII, prepared according to the processes outlined in reaction sequence (1) above, comprises the following steps:

k. Compounds of formula XII are converted to the corresponding dicyano compounds of formula XIII by treatment with an alkali cyanide. The reaction is suitably carried out in an aqueous solvent, e.g., water, with a miscible solvent such as alkanols, acetone and the like and suitably at a temperature between about room temperature and the reflux temperature of the reaction mixture.

l. The dicyano compounds of formula XIII are readily hydrolyzed to the corresponding dicarboxylic acids of formula XIV by the usual techniques for hydrolyzing cyanides.

m. The dicarboxylic acids of formula XIV or the corresponding esters are converted to the corresponding diols by lithium aluminum hydride reduction analogous to the procedure described in step (h) hereinabove.

n. Halogenation of the diol with phosphorus trihalide, preferably phosphorus tribromide, or other suitably halogenating agents. Halogenation with phosphorus tribromide is conveniently carried out in an inert solvent at a temperature between about 0°C. and 50°C.

o. Condensation of compounds of formula XVI with a primary amine to form the substituted dibenzo[d,f] azonines of formula I-b. The condensation can be carried out with any primary amine of the type employed in the preparation of the novel dibenzo[c,e]azepines of formula I-a as described in step (j) above. The condensation with primary amine is carried out in analogy to step (j) above preferably using pressure for lower amines, e.g., pressures up to about 250 p.s.i. and for higher amines preferably using elevated temperatures, suitably the reflux temperature of the reaction mixture, employing as solvent such inert organic solvents as hydrocarbon solvents, e.g., benzene, toluene, xylene and the like.

The novel compounds of formulas I-a and I-b are pharmaceutically useful as hypotensive agents. More specifically, they are useful in lowering the blood pressure in cases of high blood pressure or hypertension. The novel end products, i.e., the compounds of formulas I-a and I-b can be used as medicaments in the form of pharmaceutical preparations which contain these novel compounds in admixture with an organic or inorganic solid or liquid pharmaceutical excipient suitable for enteral, for example, oral or parenteral, administration. Suitable excipients are substances that do not react with the new compounds such as, for example, water, gelatin, lactose, starches, magnesium stearate, talc, vegetable oils, benzyl alcohols, gums, polyalkylene glycols, white petroleum jelly, cholesterol and other known medicinal excipients. The pharmaceutical preparations may be, for example, tablets, dragees, capsules or in liquid form solutions, suspensions or emulsions. They may be sterilized and/or contain assistants such as preserving, stabilizing, wetting or emulsifying agents, salts for regulating the osmotic pressure or buffers. They may further contain other therapeutically useful substances. They can be administered in unit dosage forms with dosage amounts adjusted according to the individual need and the recommendation of the physician.

The novel end products of this invention can be obtained in the form of free bases or as salts thereof. Salts may be converted into the free base, for example, be reaction with an alkaline reagent such as, for example, an aqueous metal hydroxide, e.g., sodium or potassium hydroxide, or an aqueous alkali metal carbonate such as sodium or potassium carbonate, and the like. A free base may be converted into its acid addition salts by reacting the former with a suitable inorganic or organic acid. Preferred salts of the compounds of this invention are obtained from therapeutically acceptable acids, e.g., inorganic acids such as mineral acids, e.g., hydrochloric, hydrobromic, sulfuric, phosphoric and the like, or organic acids such as acetic, propionic, lactic, succinic, maleic, tartaric, citric, cinnamic, salicylic and the like. Quaternary ammonium derivatives of the compounds of the invention may be obtained, for example, by reacting the tertiary base of formulas I-a or I b with a lower alkyl halide, e.g., methyl, ethyl, propyl, chloride, bromide, iodide and the like; a lower alkyl lower alkane sulfonate, e.g., methyl or ethyl methane or ethane and the like. The quaternizing reactions may be performed in the presence of a solvent such as lower alkanols, e.g., methanol, ethanol, propanol and the like; lower alkanones, e.g., acetone, methylethyl ketone and the like; organic acid amides, e.g., formamide and the like.

The novel compounds and processes of this invention are more fully described in the specific examples which follow. These examples are illustrative of the invention and are not to be construed as limitative thereof. The invention also includes any variant of the processes in which an intermediate obtained at any stage of the process is used as starting material and the remaining step or steps are carried out, or in which the starting materials are formed in the course of the reaction, or are present in the form of their salts or quaternary ammonium derivatives or acyl compounds.

EXAMPLE 1

Preparation of ethyl ester of 2-(3,4-dimethoxyphenyl)-4,6-dioxocyclohexane carboxylic acid Forty-six g. of sodium (2 moles) was dissolved in 1,200 ml. of ethanol in a 5 l. flask provided with a stirrer, heating mantle, and a reflux condenser topped by a drying tube. After all the sodium had dissolved, 335 g. of diethyl malonate (2.05 moles) was added followed by 412 g. of veratralacetone (2.0 moles). The solution gradually turned pale yellow, amber, deep red, and finally dirty organge, and after one hour at about 25°, the mixture was stirred and refluxed for 2 hours. After cooling to 0°, the sodium salt that had formed was filtered off, washed twice with ether, and dried. The solid was dissolved in 3 l. of cold water and the ester precipitated by the addition of 500 ml. of 4N hydrochloric acid (175 ml. of concentrated acid plus 325 ml. of water). The ester was filtered off, washed well with water and dried to constant weight at 100°. For analysis, a sample was recrystallized from 10% aqueous ethanol and obtained as fine needles, m.p. 176°–177°.

| $C_{17}H_{20}O_6$ | Calcd: | C, 63.74; H, 6.29 |
| (320.23) | Found: | C, 63.87; H, 6.16 |

EXAMPLE 2

Alternative preparation of the ethyl ester of 2-(3,4-dimethoxyphenyl)-4,6-dioxocyclohexane carboxylic acid Two and three tenths g. of sodium (0.1 mole) was dissolved in 100 ml. of ethanol and to this solution 23.4 g. of ethyl 3,4-dimethoxycinnamate (0.098 mole) and 14.0 g. of ethyl acetoacetate (0.108 mole) were added. The resulting solution was stirred and refluxed for 4.5 hours after which it was cooled and then poured into 500 ml. of ether. A white solid precipitated. This solid was recovered by filtration, washed with ether and air dried. It was dissolved in water and on acidification with acetic acid, a white crystalline solid separated. This solid was collected by filtration and recrystallized from dilute ethanol yielding 7.4 g. of white needles, m.p. 176°–177°. M.P. on mixture with the substance prepared from veratralacetone unchanged; IR and UV spectra identical.

| $C_{17}H_{20}O_6$ | Calcd: | C, 63.74; H, 6.29 |
| (320.23) | Found: | C, 63.87; H, 6.16 |

EXAMPLE 3

Preparation of 2-(3,4-dimethoxyphenyl)-4,6-dioxocyclohexane carbonitrile 20.6 g. of veratralacetone (0.1 mole) was reacted with 13 g. of ethyl cyanoacetate (0.115 mole) in a solution of 2.3 g. of sodium in 100 ml. of ethanol. After 3 hours refluxing, the solution was cooled to room temperature and poured into 500 ml. of ethyl ether whereupon a dense amber-colored solid settled out. This salt was recovered by filtration, washed with ether, and dried. It was then dissolved in approximately 1 l. of water and acetic acid added to pH 4. A gummy solid separated which disintegrated to a yellowish powder on stirring. This solid was filtered, washed with water and dried. it was recrystallized twice from aqueous ethanol after which the melting point was constant at 178.5°–181°.

| $C_{15}H_{15}NO_4$ | Calcd: | C, 65.92; H, 5.23; N, 5.13 |
| (273.29) | Found: | C, 66.13; H, 5.24; N, 5.24 |

EXAMPLE 4

Preparation of ethyl ester of 4,6-dibromo-3,5-dihydroxy-3',4'-dimethoxybiphenyl-2-carboxylic acid One hundred and sixty g. of ethyl ester of 2-(3,4-dimethoxyphenyl)-4,6-dioxocyclohexane carboxylic acid was dissolved in a mixture of 500 ml. of dry pyridine and 500 ml. of dimethylformamide, and to this stirred solution, kept at 0°–4°, 216 g. of bromine (1.35 moles, 72 ml.) was added dropwise over a period of 6 hr. The initially, almost colorless solution turned pale yellow then amber and finally deep reddish brown after all the bromine had been added, and after about half of the bromine had been added a precipitate of pyridine hydrobromide appeared. The bromination mixture was allowed to stand at room temperature for at least 4 hr., then poured into 3 l. of water whereupon the pyridine hydrobromide dissolved and a brownish amber precipitate slowly began to crystallize from the liquid. After 24 hrs., the precipitate was filtered off, washed free of bromide and pyridine with water, then dried to constant weight at 70°, m.p. 145°–147.5°.

| $C_{17}H_{16}Br_2O_6$ | Calcd: | C, 42.88; H, 3.39; Br, 33.57 |
| (476.15) | Found: | C, 43.15; H, 3.68; Br, 33.62 |

EXAMPLE 5

Preparation of ethyl ester of 4,6-dibromo-3,3',4,5'-tetramethoxybiphenyl-2-carboxylic acid Four hundred and twelve g. of ethyl ester of 4,6-dibromo-3,5-dihydroxy-3',4'-dimethoxybiphenyl-2-carboxylic acid (0.87 mole) was dissolved in 2.5 l. of toluene containing 438 g. of dimethylsulfate (3.46 moles) and 459 g. of anhydrous sodium carbonate (4.33 moles). The reaction mixture was stirred and refluxed under a Dean-Stark trap for 6 hours, after which it was cooled, one L. of water and 50 ml. of ammonia were added and then stirred for one-half hour. The aqueous layer was separated, the organic layer washed with water until neutral, then dried over magnesium sulfate and 50 g. of Woelm alumina. Removal of the solvent from the filtrate left a brown syrup that crystallized on standing at room temperature. This solid was dissolved in 1.5 l. of hot n-butanol. On standing at room temperature for several hours, the solution deposited white crystals. These were recovered by filtration, washed twice on the filter with petroleum ether (60°–90°) to remove the butanol, then finally air dried.

The white crystalline ester had a melting point of 93°–94°. This product was analyzed directly since it showed a single spot of thin layer chromatography.

| $C_{19}H_{20}Br_2O_6$ | Calcd: | C, 45.25; H, 3.99; Br, 31.70 |
|---|---|---|
| (504.21) | Found: | C, 45.50; H, 4.21; Br, 31.53 |

EXAMPLE 6

Preparation of ethyl ester of 4, 6-dibromo-2'-chloromethyl-3,4',5,5'-tetramethoxybiphenyl-2-carboxylic acid One half mole of ethyl ester of 4,6-dibromo-3,3',4,5'-tetramethoxybiphenyl-2-carboxylic acid (252 g.) was dissolved in two l. of 99 per cent formic acid of 40°. To this was added 750 ml. of 37 per cent formaldehyde solution (10 moles) and 750 ml. of conc. hydrochloric acid. A stream of hydrogen chloride was bubbled into the stirred mixture as it was warmed to 80°–85° over a 90-minute period. After 45 minutes thin layer chromatography showed that the starting material had disappeared. The mixture was poured into three l. of cold water, one l. of benzene added and the two-phase-mixture stirred for an hour to dissolve the gum which had separated. The benzene layer was removed and the aqueous layer extracted three times more with 100 ml. portions of benzene. The combined oil layers were washed successively with water, saturated bicarbonate solution, and water, dried over magnesium sulfate, filtered and the solvent distilled under reduced pressure. A pale yellow oil (280 g.) which remained, crystallized slowly. This residue was dissolved in 1.5 l. of hot isopropanol, the solution filtered, and on chilling overnight, a white crystalline solid separated. This was recovered by filtration, washed twice on the filter with petroleum ether (60°–90°) and air-dried, m.p. 110°–112°. An analytical sample, m.p. 112.5°–114° was obtained by one more recrystallization from isopropanol.

| $C_{20}H_{21}Br_2ClO_6$ | Calcd: | C, 43.46; H, 3.83 (Cl+Br) 35.34 |
|---|---|---|
| (552.68) | Found: | C, 43.70; H, 4.12 (Cl+Br) 35.08 |

EXAMPLE 7

Preparation of 4,6-dibromo-2'-hydroxymethyl-3,4',5,5'-tetramethoxy-biphenyl-2-carboxylic acid Twenty-two and one tenth g. of ethyl ester of 4,6-dibromo-2'-chloromethyl-3,4',5,5'-tetramethoxybiphenyl-2-carboxylic acid (0.04 mole) was refluxed in a mixture of 200 ml. of dioxane and 200 ml. of 2N sodium hydroxide for 20 hours. The solvents were distilled under reduced pressure and approximately 500 ml. of water added to dissolve the residue. Dilute sulfuric acid was added to pH approximately 8.5 and the flocculent precipitate that resulted filtered off on a bed of Celite. Dilute sulfuric acid was added to the hot filtrate to pH 3 whereupon a granular, almost white solid separated. After the suspension had cooled to room temperature, the solid was recovered by filtration, and washed well with water. The solid which was dried at room temperature in vacuo over $CaCl_2$, had a m.p. in the range of 115°–125°, but thin layer chromatography showed it was homogeneous. Recrystallization from a 1:1 mixture of ethyl acetate/petroleum ether (60°–90°) gave a crystalline product melting at 173°–175°.

| $C_{18}H_{18}Br_2O_7$ | Calcd: | C, 42.77; H, 3.59; Br, 31.48 |
|---|---|---|
| (505.47) | Found: | C, 42.95; H, 3.55; Br, 31.77 |

EXAMPLE 8

Preparation of 2'-hydroxymethyl-3,4',5,5'-tetramethoxydiphenyl-2-carboxylic acid Twenty-five and three tenths g. of 4,6-dibromo-2'-hydroxymethyl-3,4',5,5'-tetramethoxybiphenyl-2-carboxylic acid (0.05 moles) was dissolved in 235 ml. of ethanol and 6.0 g. of sodium hydroxide (0.15 moles) in 15 ml. of water added, followed by 10 g. Raney nickel. The mixture was shaken under 50 lbs. of hydrogen pressure at 60° for 12 hours after which no more hydrogen was taken up. The nickel was filtered off on a bed of Celite, washed with water, then the yellow filtrate extracted once with 75 ml. of benzene, then with 25 ml. of benzene. Acidification with 10 per cent sulfuric acid to pH 3, followed by digestion on the steam bath for an hour, gave after cooling, a solid which was refluxed with 2 g. of NaOH in 60 ml. of $H_2O$ and 200 ml. of dioxane for 4 hours, cooled, extracted with 50 ml. of $C_6H_6$, then acidified at room temperature with $H_2SO_4$, whereupon a white solid precipitated. This was filtered, washed and dried, m.p. 179.5°– 180° foaming. Recrystallization from one liter of toluene gave 5 g. of solid, m.p. 186°–187° foaming. Analytical sample was obtained by one more recrystallization from toluene, m.p. 189°–190°.

| $C_{18}H_{20}O_7$ | Calcd: | C, 62.06; H, 5.79 |
|---|---|---|
| (348.36) | Found: | C, 62.01; H, 5.80 |

EXAMPLE 9

Preparation of 4,6-dibromo-3,4',5,5'-tetramethoxydiphenic acid

Forty five g. of 4,6-dibromo-2'-hydroxymethyl-3,4',5,5'-tetramethoxybiphenyl-2-carboxylic acid (0.089 moles) m.p. 115°–125° was dissolved in 900 ml. of water containing 17 g. of potassium hydroxide. To the stirred solution at 60°, potassium permanganate solution (21.5 g. in 350 ml. of water) was added dropwise until a faint pink color persisted when a drop of the supernatant solution was spotted on filter paper. The green color characteristic of the manganate ion persisted during the addition of the oxidant until manganese dioxide precipitated; and generally 10–25 ml. of the permanganate solution remained unused at the end point. One or two ml. of methanol was added, the suspension brought to the boiling point, and filtered hot through a bed of Celite. The filter cake was resuspended twice in boiling water and refiltered to recover additional diphenic acid. The acid was precipitated from the combined hot filtrates by the addition of 12N sulfuric acid to pH 3. When the mixture had cooled to room temperature, the solid was recovered by filtration, washed well with water and dried. This product melted at 204°–207.5°. Recrystallization from nitroethane raised the melting point of the pale cream colored solid to 205°–208°.

| | | |
|---|---|---|
| $C_{18}H_{16}Br_2O_8$ | Calcd: | C, 41.56; H, 3.10; Br, 30.73 |
| (520.16) | Found: | C, 41.38; H, 3.00; Br, 30.58 |

EXAMPLE 10

Preparation of 3,4′,5,5′-tetramethoxydiphenic acid

The dibromo acid, 4,6-dibromo-3,4′,5,5′-tetramethoxydiphenic acid, 25.1 g. (0.05 moles) was shaken under 50 pounds of hydrogen pressure in 250 ml. of acetic acid solution together with 12.3 g. of anhydrous sodium acetate and 10 g. of 10 per cent palladium on carbon catalyst at 60° for 22 hours. After cooling to room temperature, the catalyst was filtered, washed with acetic acid, and the filtrate evaporated to dryness under reduced pressure. The residue was dissolved in 300 ml. of water, and 10 per cent sulfuric acid added to pH 3, whereupon the acid precipitated. After digesting for an hour on the steam bath, the suspension was cooled in ice, the solid recovered by filtration, washed well with water and dried to yield white crystals melting at 221° with gas evolution.

| | | |
|---|---|---|
| $C_{18}H_{18}O_8$ | Calcd: | C, 59.67; H, 5.01 |
| (362.34) | Found: | C, 59.34; H, 5.11 |

The mass spectrum of the synthetic acid showed a molecular weight of 362. The NMR spectrum, in dimethylsulfoxide solution, showed chemical shifts as follows: at 231, 231, 232, 233 cps., 12 protons (4 × $CH_3O$); at 385 and 400 cps, a pair of protons, para substitution, and at 411 and 450 cps another pair of protons in meta substitution. A sample of the acid obtained by degradation of the alkaloid showed an identical spectrum.

EXAMPLE 11

3,4′,5,5′-tetramethoxy-2,2′-diphenyldimethanol a. By reduction of the dimethyl ester of 3,4′,5,5′-tetramethoxydiphenic acid The ester, 7.8 g. (0.02 mole) was reduced by refluxing a stirred suspension of 2.28 g. (0.06 mole) of $LiAlH_4$ in 250 ml. and washing the ester from an extraction thimble into the suspension. After all the ester had been added, the mixture was refluxed for another hour. Excess reductant and the complex were decomposed by the dropwise addition of water to the ice-cold suspension. After the decomposition, Celite was added and the oxides filtered through a bed of Celite, washing the filter cake with boiling toluene. From the combined filtrates, 6.6 g. of a white solid was obtained. Recrystallization of the solid from toluene gave 6.0 g. of solid, m.p. 154°–156°. A second recrystallization of a 0.5 g. sample gave a TLC homogeneous material, m.p. 156.5°–158° to a turbid liquid, clear at 159°.

| | | |
|---|---|---|
| $C_{18}H_{22}O_6$ | Calcd: | C, 64.65; H, 6.63 |
| (334.36) | Found: | C, 64.39; H, 6.88 | b. By reduction of 2′-hydroxymethyl-3,4′,5,5′-tetramethoxybiphenyl-2-carboxylic acid To a suspension of 6 g. of lithium aluminum hydride (0.143 mole) in 150 ml. of dry tetrahydrofuran, 25 g. of 2′-hydroxymethyl-3,4′,5,5′-tetramethoxybiphenyl-2-carboxylic acid in 500 ml. of dry tetrahydrofuran was added dropwise. The reaction mixture was decomposed as usual with water, after a two-hour reflux. After filtering off the mixed oxides on a bed of filter aid, hot chloroform was used to wash the filter cake. Distillation of the solvent from the combined filtrates at reduced pressure left a white crystalline solid, 22.2 g., m.p. 156°–158°, unchanged on mixture with the above diol.

EXAMPLE 12

Preparation of 6-bromo-3,4′,5,5′-tetramethoxy-2,2′-biphenyldimethanol by reduction of the dimethyl ester of 4,6-dibromo-3,4′,5,5′-tetramethoxydiphenic acid Five and forty-eight hundredths g. of the dimethyl ester 4,6-dibromo-3,4′,5,5′-tetramethoxydiphenic acid (0.2 mole) was reduced with 1.67 gg. of $LiAlH_4$ (0.44 mole) in 500 ml. of ether in the same manner as described in Example 11 above. The suspension was refluxed for one hour after all the ester had been extracted. From the ether solution, after decomposition of the excess hydride and complex, there was obtained 1.4 g. of solid, m.p. 167°–170°. The cake of oxides and filter aid was then extracted for 5 hours with refluxing benzene. From the solvent 2.4 g. of solid, m.p. 167.5°–173° was obtained. This was combined with the previous solid and the whole recrystallized from 125 ml. of ethyl acetate. From the filtrate at room temperature the diol may be obtained in the form of cottony needles, m.p. 157°–158° or dense rhombs melting at 158°–159°.

| | | |
|---|---|---|
| $C_{18}H_{21}BrO_6$ | Calcd: | C, 52.31; H, 5.12; Br, 19.34 |
| (413.38) | Found: | C, 52.45; H, 5.32; Br, 19.57 (needles) |
| | | C, 52.06; H, 5.26; Br, 20.18 (rhombs) |

EXAMPLE 13

Preparation of α,α-dibromo-3,4′,5,5′-tetramethoxy-o,o′-bitolyl

The diol (8.62 mmoles) was suspended in 350 ml. of dry ether at 0° and to this 2.33 g. (8.33 g.) (8.3 mmoles) of phosphorus tribromide was added with stirring, care being taken to prevent the access of moisture. The solid became gummy but after 1.5 hours, it had all dissolved. At this point the mixture stood overnight at room temperature. The ethereal solution was washed successively with water, saturated bicarbonate solution, and water, then dried and the solvent removed in vacuo. A colorless syrup was obtained that slowly set to a mass of crystals. A single recrystallization from petroleum ether (60°–90°) gave crystals, m.p. 124°–126°, homogeneous by TLC.

| | | |
|---|---|---|
| $C_{18}H_{20}Br_2O_4$ | Calcd: | C, 46.98; H, 4.38; Br, 34.73 |
| (460.19) | Found: | C, 46.89; H, 4.63; Br, 34.84 |

EXAMPLE 14

Preparation of
6-allyl-6,7-dihydro-2,3,8,10-tetramethoxy-5H-dibenz[c,e]azepine hydrochloride Four and six-tenths g. (0.01 mole) of α,α-dibromo-3,4',5,5'-tetramethoxy-o,o'-bitolyl was dissolved in 100 ml. of dry benzene and 1.3 g. (0.03+ moles) of allyl amine added, the solution being protected from atmospheric moisture. Within a minute a turbidity formed gradually increasing to a mass of crystals. After 72 hours at room temperature, water was added followed by 10 ml. of 10 per cent sodium hydroxide. The aqueous solution was extracted three times with 200 ml. of ether-benzene (1:1), the extracts dried over anhydrous potassium carbonate, then the solvents removed in vacuo leaving 1.22 g. of a pale colored oil. A few ml. of isopropanol were added to dissolve the oil and the free base converted to the hydrochloride by addition of hydrochloric acid to pH 3. After evaporating to dryness, redissolving in isopropanol and repeating, a crystalline residue was obtained.

The salt was recrystallized from a mixture of ethanol and ethyl acetate and obtained as small dense rhombs of m.p. 241°–242° dec.

| | | |
|---|---|---|
| $C_{21}H_{25}NO_4 \cdot HCl$ | Calcd: | C, 64.36; H, 6.69; Cl, 9.05 |
| (391.90) | Found: | C, 64.39; H, 6.80; Cl, 9.00 |

EXAMPLE 15

Preparation of
3,4',5,5'-tetramethoxy-2,2'-biphenyldiacetonitrile

The dibromomethyl compound α,α-dibromo-3,4',5,5'-tetramethoxy-o,o'-bitolyl, 2.3 g., (5 mmoles) was dissolved in 15 ml. of acetone and to this solution was added 1.3 g. (20 mmoles) of potassium cyanide in 2.5 ml. of water. The stirred mixture was kept at 50° for 3.5 hours after which it was poured into water and the solid which formed recovered by extraction with ether. From the ether extracts, after removal of the solvent, there remained a colorless oil that crystallized on scratching. The solid was recrystallized once from methanol to give crystals, m.p. 114°–116°. A second recrystallization of a sample gave material homogeneous on TLC, m.p. 116.5°–118.5°.

| | | |
|---|---|---|
| $C_{20}H_{20}N_2O_4$ | Calcd: | C, 68.17; H, 5.72; N, 7.95 |
| (352.38) | Found: | C, 67.92; H, 5.98; N, 8.04 |

EXAMPLE 16

Preparation of
3,4',5,5'-tetramethoxy-2,2'-biphenyldiacetic acid

The nitrile is hydrolyzed by refluxing 3,4',5,5'-tetramethoxy-2,2'-biphenyldiacetonitrile with a solution of potassium hydroxide in n-butanol until the evolution of ammonia ceases, approximately 48 hours. The excess butanol is distilled off, the residue dissolved in water and acidified to give 3,4',5,5'-tetramethoxy-2,2'-biphenyldiacetic acid.

EXAMPLE 17

Preparation of
3,4',5,5'-tetramethoxy-2,2'-bis-(2-hydroxyethyl)-biphenyl

Reduction of the diacetic acid is accomplished by the addition of a solution of 3,4',5,5'-tetramethoxy-2,2'-biphenyldiacetic acid in dry tetrahydrofuran to a suspension of lithium aluminum hydride in tetrahydrofuran. After all of the acid has been added, the excess hydride and the complex are decomposed by the cautious addition of water until the precipitate of oxides becomes colorless and granular. The solids are then filtered off on a bed of filter aid, the cake washed with hot chloroform, and the solvents removed from the filtrate by distillation under reduced pressure leaving a solid. This residue is recrystallized to give 3,4',5,5'-tetramethoxy-2,2'-bis-(2-hydroxyethyl)biphenyl.

EXAMPLE 18

Preparation of
3,4',5,5'-tetramethoxy-2,2'-bis-(2-bromoethyl)-biphenyl

Phosphorus tribromide is added in small portions to a solution of 3,4',5,5'-tetramethoxy-2,2'-bis-(2-hydroxyethyl)-biphenyl dissolved in ether, maintained at 0°, and protected from atmospheric moisture. After all the phosphorus tribromide has been added the mixture remains at room temperature for 2 hours. It is then poured into ice-water, the organic layer washed successively with water, sodium bicarbonate solution, water, and air dried. Removal of the solvent leaves an oil, that slowly crystallizes. The solid is recrystallized from petroleum ether (B.p. 60°–90°) and the product obtained as crystals of 3,4',5,5'-tetramethoxy-2,2'-bis-(2-bromoethyl)biphenyl.

EXAMPLE 19

Preparation of
7-methyl-2,3,10,12-tetramethoxy-6,7,8,9-tetrahydro-5H-dibenzo[d,f]azonine The dibromide 3,4',5,5'-tetramethoxy-2,2'-bis-(2-bromoethyl)-biphenyl is added to a benzene solution of mono-methylamine and the mixture heated in an autoclave under 200 PSI of nitrogen pressure for 4 hours at 135°. When cool, the contents of the autoclave, a crystalline precipitate suspended in benzene, are filtered. The solid remaining on the filter is methylamine hydrobromide. The benzene solution is extracted with 5 per cent hydrochloric acid, the extract made alkaline, and the bases extracted into ether-benzene (1:1). The combined basic extracts are dried and the solvent removed, leaving a colorless oil. This oil is passed over a column of activated alumina, and the tertiary base eluted from the column by petroleum ether. Upon removal of the solvent, there remains a colorless oil that on scratching, crystallizes. This product was dissolved in a little methanol, and on chilling, crystals of the methanol complex of 7-methyl-2,3,10,12-tetramethoxy-6,7,8,9-tetrahydro-5H-dibenzo[d,f]azonine separate, m.p. 76°–78°.

EXAMPLE 20

This example illustrates suitable pharmaceutical formulations incorporating the novel substituted dibenzopolymethylene imines of this invention.

Suppository Formulation

| | Per 1.3 Gm Suppository |
|---|---|
| 6-Allyl-6,7-dihydro-2,3,8,10-tetramethoxy-5H-dibenz[c,e]azepine hydrochloride | 0.025 gm. |
| Wecobee M* | 1.230 gm. |
| Carnauba Wax | 0.045 gm. |
| Total Weight | 1.300 gm. |

*E. F. Drew Company
522 Fifth Avenue
New York 10, New York

Procedure:
1. The Wecobee M and the carnauba wax were melted in a suitable size glass lined container, mixed well and cooled to 45°C.
2. 6-Allyl-6,7-dihydro-2,3,8,10-tetramethoxy-5H-dibenz[c,e]azepine hydrochloride, which had been reduced to a fine powder with no lumps, was stirred until completely and uniformly dispersed.
3. The mixture was poured into suppository molds to yield suppositories having an individual weight of 1.3 gms.
4. The suppositories were cooled and removed from molds. They were then individually wrapped in wax paper for packaging.

Capsule Formulation

| | Per Capsule |
|---|---|
| 6-Allyl-6,7-dihydro-2,3,8,10-tetramethoxy-5M-dibenz[c,e]azepine hydrochloride | 25.5 mg. |
| Lactose | 159.5 mg. |
| Corn Starch | 30.0 mg. |
| Talc | 5.0 mg. |
| Total Weight | 220.0 mg. |

Procedure:
1. 6-Allyl-6,7-dihydro-2,3,8,10-tetramethoxy-5H-dibenz[c,e]azepine hydrochloride, latcose, and corn starch were mixed in a suitable mixer.
2. The mixture was passed through a Fitzpatrick Comminuting Machine using a No. 1A screen and knives forward.
3. The mixture was returned to the mixer and the talc added. It was blended well and filled into No. 4 two piece, hard gelatin capsules on a Parke Davis capsulating machine. (Any similar type capsulating machine may be used.)

Tablet Formulation

| | Per Tablet |
|---|---|
| 6-Allyl-6,7-dihydro-2,3,8,10-tetramethoxy-5H-dibenz[c,e]azepine hydrochloride | 10.0 mg. |
| Lactose | 129.0 mg. |
| Corn Starch | 50.0 mg. |
| Pregelatinized Corn Starch | 8.0 mg. |
| Calcium Stearate | 3.0 mg. |
| Total Weight | 200.0 mg. |

Procedure:
1. 6-Allyl-6,7-dihydro-2,3,8,10-tetramethoxy-5H-dibenz[c,e]azepine hydrochloride, lactose, corn starch and pregelatinized corn starch were mixed in a suitable mixer.
2. The mix was passed through a Fitzpatrick Comminuting Machine fitted with No. 1A screen and with knives forward.
3. The mixture was returned to the mixer and moistened with water to a thick paste. The moist mass was passed through a No. 12 screen, and the moist granules were dried on paper lined trays at 110°F.
4. The dried granules were returned to the mixer, and the calcium stearate was added and mixed well.
5. The granules were compressed at a tablet weight of 200 mg. using standard concave punches having a diameter of 5/16 inch.

Parenteral Formulation

| Each 1 cc. ampul contains: | | Per cc. |
|---|---|---|
| 6-Allyl-6,7-dihydro-2,3,8,10-tetramethoxy-5H-dibenz[c,e]azepine hydrochloride | | 5.1 mg. (2% excess) |
| Methyl Paraben U.S.P. | | 1.8 mg. |
| Propyl Paraben, U.S.P. | | 0.2 mg. |
| Water for Injection U.S.P. | q.s. ad | 1 cc. |

Preocedure (For 10,000 cc.):
1. In a clean glass or glass-lined vessel, 8,000 cc. of Water for Injection were heated to 90°C. It was then cooled to 50°–60°C., and 18 gms. of methyl paraben and 2 gms. of propyl paraben were added and dissolved with stirring. The solution was then allowed to cool to room temperature.
2. The 51.0 gms. of 6-allyl-6,7-dihydro-2,3,8,10-tetramethoxy-5H-dibenz[c,e]azepine hydrochloride were added under an atmosphere of nitrogen and stirred until completely dissolved.
3. Sufficient Water for Injection was then added to make a total volume of 10,000 cc.
4. This solution was then filtered through an O2 Selas candle, filled into suitable size ampuls, gassed with nitrogen and sealed. It was autoclaved at 10 lbs. PSI for 30 minutes.

We claim:
1. A compound of the formula

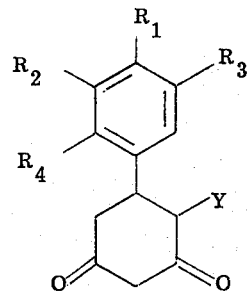

wherein $R_1$ and $R_2$ are each lower alkoxy; $R_3$ and $R_4$ are each hydrogen; and Y is a carboxylic acid lower alkyl ester group.

2. The compound according to claim 1 wherein $R_1$ and $R_2$ are each methoxy.

* * * * *